UNITED STATES PATENT OFFICE.

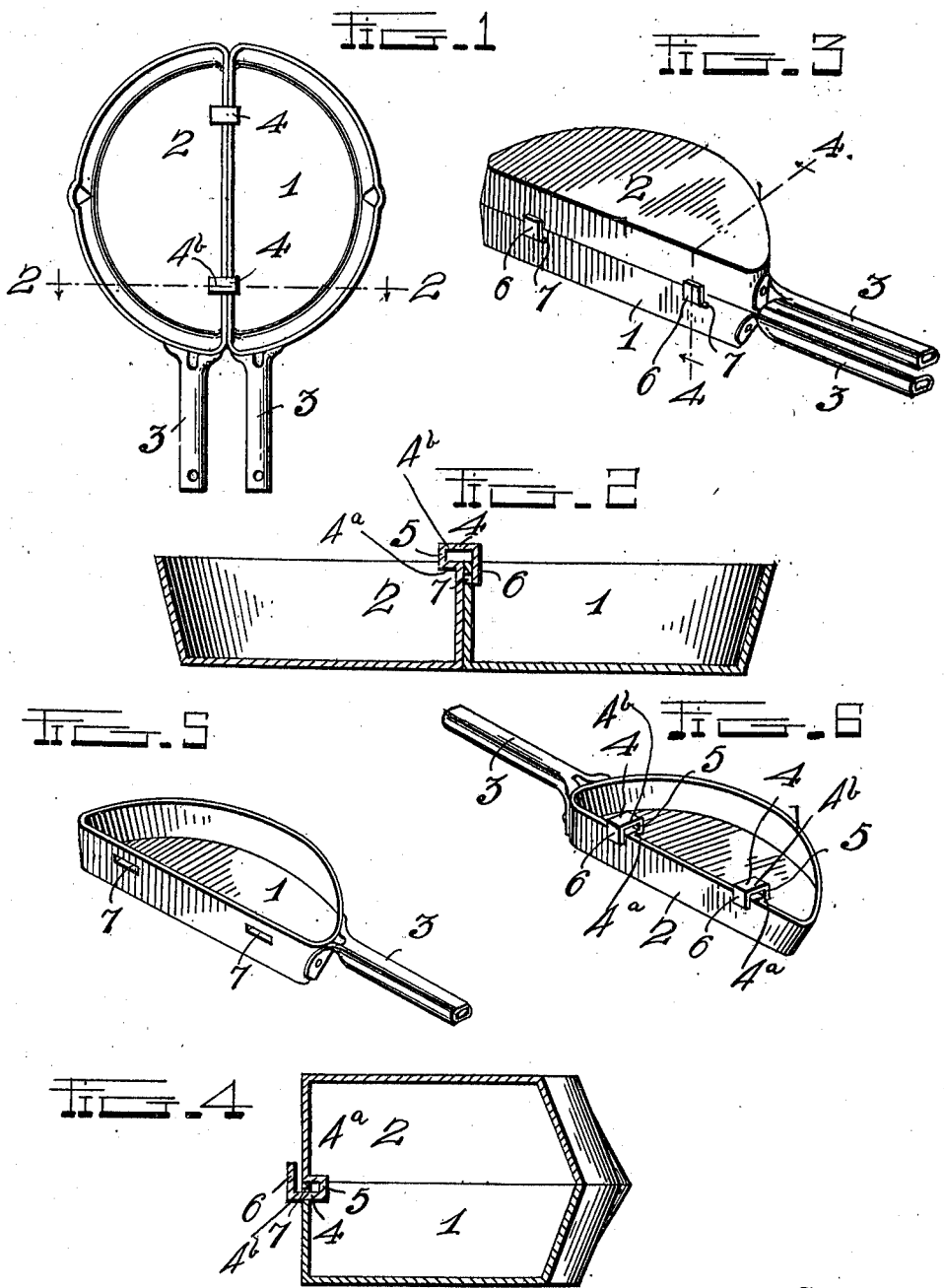

EDWARD A. HUDSON, OF OQUAWKA, ILLINOIS.

SKILLET.

993,169.  Specification of Letters Patent.  Patented May 23, 1911.

Application filed May 31, 1910. Serial No. 564,094.

*To all whom it may concern:*

Be it known that I, EDWARD A. HUDSON, a citizen of the United States, residing at Oquawka, in the county of Henderson and State of Illinois, have invented certain new and useful Improvements in Skillets; and I do declare the following to be a full, clear, and exact description of the invention, such as will enable others skilled in the art to which it appertains to make and use the same.

This invention relates to improvements in skillets.

The object of the invention is to improve the construction of skillet shown and described in United States Letters Patent Number 905,318 granted to me December 1, 1908, whereby the skillet shown and described therein may be employed both as a skillet and a roasting pan.

With this and other objects in view the invention consists of certain novel features of construction, combination and arrangement of parts as will be more fully described and particularly pointed out in the appended claims.

In the accompanying drawings; Figure 1 is a plan view of my improved skillet showing the parts opened out in position for use as a double frying pan; Fig. 2 is a vertical sectional view of the same on the line 2—2 of Fig. 1; Fig. 3 is a perspective view showing the parts of the skillet in closed position for use as a roasting pan. Fig. 4 is a cross sectional view on the line 4—4 of Fig. 3; Fig. 5 is a detail perspective view of one section of the pan; and, Fig. 6 is a similar view of the other section of the pan.

Referring more particularly to the drawings 1 denotes one of the sections of the skillet and 2 denotes the other section. The sections 1 and 2 are of substantially semi-circular form and are adapted to be brought together with their flat sides in engagement to form a double pan which may both be applied to the same burner of a stove thus enabling two different kinds of food to be cooked at the same time. In addition to the use of the sections of the pan for forming a double cooking utensil said sections may be closed together one above the other as shown in Fig. 3 of the drawings thus forming a roasting pan.

The sections 1 and 2 are provided with suitable handles 3 and in order to hold the sections together in operative position for forming a double frying pan and also for hingedly connecting the same together for forming a roasting pan I provide said sections with suitable fastening means. The means for fastening and hingedly connecting said sections together comprises one or more substantially rectangular shaped loops or hooks 4 provided on the upper edge of the flat side of one of the sections, as for example, 2, said means also comprises longitudinal slots 7 formed in the flat side of the other section 1 for the purpose of receiving the hooks 4. The hooks 4 are of peculiar construction, and each consists of a horizontal lower portion extending inwardly from the straight or flat side of the section 2, a vertically extending portion 5 rising from the portion $4^a$, an upper horizontally extending portion $4^b$ extending outwardly beyond the flat side wall, and a vertically disposed extremity or lug 6 which depends from the outer end of the portion $4^b$ and terminates below the upper edge of said flat or straight wall of the section 2, as clearly shown in Fig. 2. Owing to this construction, the end 6 of the hook or loop 4 will be spaced slightly from the flat wall of the section 2 so as to receive the flat wall of the section 1, as shown in Fig. 2, and thereby serve to maintain the two sections in engagement when the latter are used as frying pans, as in Figs. 1 and 2. The peculiar shape of the hook or loop 4 enables the latter to readily enter the slot 7 so that the two sections 1, 2 may be hinged together and placed in superposed relation, as shown in Figs. 3 and 4, to permit them to be used as a roasting pan. Owing to this peculiar hinged connection which is shown more clearly in Fig. 4, it will be seen that the uppermost section may be swung upwardly to permit of the inspection of the food being roasted in the lower section of the pan, without danger of the two sections being disconnected or the upper section slipping off the lower one. In other words, the peculiar shape of the hooks or loops 4 and their off-set arrangement on the upper edge of the flat wall of one of the pan sections, effectively prevents such section from slipping off the other section when the upper section is lifted or swung upwardly to permit of the inspection of the food being roasted.

When the pan is to be employed as a double frying pan the sections are opened out to the position shown in Fig. 1 of the drawings and when in this position the downwardly projecting lugs 6 on the ends of the hooks will fit over the upper edge of the flat side of the slotted section of the pan and into engagement with the inner surface of said flat side thereby holding said sections in operative engagement to form the double frying pan.

By constructing the fastening devices for the sections of the pan as herein shown and described it will be seen that said sections may be securely held in position to form a double skillet or hingedly connected together to form a small roasting pan which may be readily opened and closed when desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim is:

1. A cooking utensil comprising a plurality of pan sections having flat upright walls to engage each other, the flat wall of one being formed with a horizontal slot, and a transversely disposed hook-shaped loop arranged in an offset position on the straight wall of the other section for engagement with said slot to detachably hinge said pan sections together, said loop extending inwardly from the flat wall which carries it, then upwardly, then outwardly, and then downwardly, whereby the pan section having the loop may be swung over upon the other pan section to form a cover for the same, the offset position of the loop permitting the superimposed pan section to be readily swung upwardly without said section slipping off of the lower one.

2. A cooking utensil comprising a plurality of pan sections, each having flat upright walls to engage each other, the flat wall of one section being formed with longitudinal slots and substantially rectangular hooks provided on the upper edge of the flat wall of the other section and having lower horizontal portions extending inwardly from said flat wall, upright portions rising from said lower horizontal portions, upper horizontal portions extending outwardly from said upright portions, and depending ends extending downwardly from the upper horizontal portions and being spaced from the outer surface of the flat wall of the last mentioned section, said hooks being adapted to engage the slots when the sections are placed in superposed position, whereby the sections will be hingedly connected and the upper section may be swung upwardly to permit of the inspection of the contents of the lower section without the upper section slipping off the lower one.

In testimony whereof I have hereunto set my hand in presence of two subscribing witnesses.

EDWARD A. HUDSON.

Witnesses:
R. B. PARSONS,
GEO. L. HARTGROVE.

---

Copies of this patent may be obtained for five cents each, by addressing the "Commissioner of Patents, Washington, D. C."